(12) United States Patent
Wan et al.

(10) Patent No.: US 10,133,814 B2
(45) Date of Patent: Nov. 20, 2018

(54) GENERATING EXPLANATORY ELECTRONIC DOCUMENTS USING SEMANTIC EVALUATION

(71) Applicant: Accenture Global Solutions Limited, Dublin (IE)

(72) Inventors: Dadong Wan, San Jose, CA (US); Freddy Lecue, Dublin (IE); Caroline Brazil, Offaly (IE)

(73) Assignee: Accenture Global Solutions Limited, Dublin (IE)

( * ) Notice: Subject to any disclaimer, the term of this patent is extended or adjusted under 35 U.S.C. 154(b) by 234 days.

(21) Appl. No.: 15/244,625

(22) Filed: Aug. 23, 2016

(65) Prior Publication Data

US 2018/0060424 A1    Mar. 1, 2018

(51) Int. Cl.
*G06F 17/30* (2006.01)
*H04L 29/08* (2006.01)

(52) U.S. Cl.
CPC ...... *G06F 17/30702* (2013.01); *H04L 67/306* (2013.01)

(58) Field of Classification Search
CPC ......... G06F 17/30702; G06F 17/30864; G06F 17/30867; G06F 17/30716; G06F 17/30672

See application file for complete search history.

(56) References Cited

U.S. PATENT DOCUMENTS

| | | | | |
|---|---|---|---|---|
| 7,783,658 B1 * | 8/2010 | Bayliss | ............. | G06F 17/30705 707/765 |
| 7,949,579 B2 * | 5/2011 | Keld | ...................... | G06Q 10/10 705/30 |
| 8,706,575 B2 * | 4/2014 | Mulry | .................... | G06Q 20/40 705/30 |
| 2015/0134640 A1 * | 5/2015 | Chetlur | ............. | G06F 17/30905 707/722 |
| 2016/0078563 A1 * | 3/2016 | Farrell | ................... | G06Q 40/12 705/35 |
| 2016/0147874 A1 * | 5/2016 | Adderly | ............. | G06F 17/2785 706/12 |

OTHER PUBLICATIONS

Australian Office Action in Australian Application No. 2017213467, dated Dec. 15, 2017, 8 pages.

* cited by examiner

*Primary Examiner* — Daniel A Kuddus
(74) *Attorney, Agent, or Firm* — Fish & Richardson P.C.

(57) ABSTRACT

Implementations are directed to providing an explanatory electronic document with actions including providing a target subject profile based on user input and one or more ontologies, the target subject profile including associations describing a subject at respective degrees of specificity, providing a set of peer user profiles using semantic user profile association between the user profile and each peer user profile in a superset of peer user profiles, retrieving one or more peer subject profiles, each peer subject profile being associated with a peer user profile in the set of peer user profiles, and including associations describing a past subject experienced by a peer user, filtering at least one association from a peer subject profile based on data provided in a knowledge graph, and providing at least one explanatory text string associated with the subject based on at least one remaining association in the peer subject profile.

30 Claims, 7 Drawing Sheets

FIG. 6

Expenditure Explanation

User: Jamie
Trip: Acquisition visit, Acme, Inc., Austin, TX, USA, 2 days

| Expense Type | Amount | Explanation |
|---|---|---|
| Taxis | $456 | This expense is unnecessarily HIGH, because 89% of peer groups use public transportation in Large Cities. |
| Dinners | $400/each | This expense is appropriate. |
| Flights | $730 | This expense is appropriate. |

GENERATING EXPLANATORY ELECTRONIC DOCUMENTS USING SEMANTIC EVALUATION

BACKGROUND

Enterprises may require individuals to plan and/or purchase goods and/or services that they are subsequently reimbursed for. In one example, individuals may need to travel, and pay for expenses during the travel. For example, travel expenses can be paid on an individual basis, where individuals pay for flights, hotels, and/or other travel accommodations based on their needs. In such examples, an absence of contextual information can limit insight into the appropriateness of expenses for a particular individual and/or a particular trip, and/or whether such expenses were necessary. Further, it can be a relatively burdensome, manual effort to differentiate between necessary/unnecessary expenses. For example, the travel expenses are subsequently scrutinized for conformance to enterprise policies, and/or regulatory schema. Non-conforming travel expenses can be resource-burdensome to audit.

SUMMARY

Implementations of the present disclosure are generally directed to generating explanatory electronic documents based on semantic evaluation. In some implementations, actions include receiving input from a user, the input comprising data that is at least partially representative of a subject, providing a target subject profile based on the input and one or more computer-readable ontologies, the target subject profile including two or more associations describing the subject at respective degrees of specificity, providing a set of peer user profiles based on a user profile and a superset of peer user profiles using semantic user profile association between the user profile and each peer user profile in the superset of peer user profiles, retrieving one or more peer subject profiles from computer-readable memory, each peer subject profile being associated with a peer user profile in the set of peer user profiles, and including one or more associations, each association describing a past subject experienced by a peer user, filtering at least one association from a peer subject profile based on a comparison with a respective association in the target subject profile and data provided in a knowledge graph, providing at least one explanatory text string associated with the subject based on at least one remaining association in the peer subject profile, and providing an explanatory electronic document including the at least one explanatory text string. Other implementations of this aspect include corresponding systems, apparatus, and computer programs, configured to perform the actions of the methods, encoded on computer storage devices.

These and other implementations can each optionally include one or more of the following features: semantic user profile association includes determining respective scores for each peer user profile in the superset of peer user profiles based on the user profile and the knowledge graph, and including a peer user profile in the set of peer user profiles based on the respective score; filtering at least one association from a peer subject profile includes determining that the at least one association is more specific than a respective association of the target subject profile, and in response, removing the at least one association; providing the at least one explanatory text string includes determining that a subject associated with the at least one remaining association is of the same type and of a different value than a respective subject of a peer subject profile, and in response, retrieving the at least one explanatory text string from computer-readable memory; the explanatory electronic document provides explanations related to one or more expenses incurred, the at least one explanatory text string being associated with a respective expense; the subject includes a trip and the input includes trip details and one or more expenses incurred; the target subject profile includes a target expenditure profile, and the two or more associations describe a trip at respective degrees of specificity; each peer subject profile includes a peer expenditure profile, and the past subject includes a trip undertaken by the peer user; actions further include receiving, from computer-readable memory, the user profile, the user profile including one or more of a role of the user, previous actions conducted by the user, and a level of experience of the user; and actions further include receiving data informative of an enterprise associated with the user, the at least one explanatory text string being partially based on the data.

Implementations of the present disclosure provide one or more of the following advantages. For example, implementations provide semantic identification of preferred contexts (e.g., expenditure profile of a user, travel profile for user profile). Implementations also provide semantic identification of necessary data patterns (e.g., necessary spending), as well as semantic identification of unnecessary data patterns subject to explanation (e.g., unnecessary spending). Implementations also provide semantic reasoning for explaining abnormal data patterns (e.g., abnormal expenses), and semantic construction of explanations using preferred contexts and unnecessary data patterns subject to explanation (e.g., unnecessary spending). Implementations further provide optimized identification of unnecessary data patterns based on semantic context. In this manner, computing resources are conserved, because less resources (e.g., processors, memory, bandwidth) are consumed through identifying unnecessary data patterns in accordance with implementations of the present disclosure.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 6 depicts an example exemplar in accordance with implementations of the present disclosure.

DETAILED DESCRIPTION

Implementations of the present disclosure are generally directed to automatically generating explanatory electronic documents based on semantic evaluation. More particularly, implementations of the present disclosure are directed to automatically generating explanatory electronic documents based on a knowledge graph (e.g., a data structure relating entities through semantic properties), semantic context association, semantic association of users, filtering, and reasoning. In some implementations, an explanatory electronic document is provided as an electronic document that is representative of a subject, and that includes one or more features of the subject. Example subjects can include an event, a set of events, an item, a product, a service, and the like. In some implementations, one or more actions are automatically executed based on the explanatory electronic document.

Implementations of the present disclosure will be described in further detail herein with reference to an example context. The example context includes enterprise travel expense review (e.g., for an employee of the enterprise). In the example context, the explanatory electronic document is provided as an explanation of expenses as necessary/unnecessary for a trip that a particular employee has undertaken. In some examples, the trip is provided as the subject, and example features of the subject include dates, reason for travel, to location(s), from location(s), conveyance(s) (e.g., planes, trains, automobiles, ferries), hotels, events, dinners, lunches, and the like, and respective expenses for each. It is contemplated, however, the implementations of the present disclosure can be realized in any appropriate context.

Figure 1:
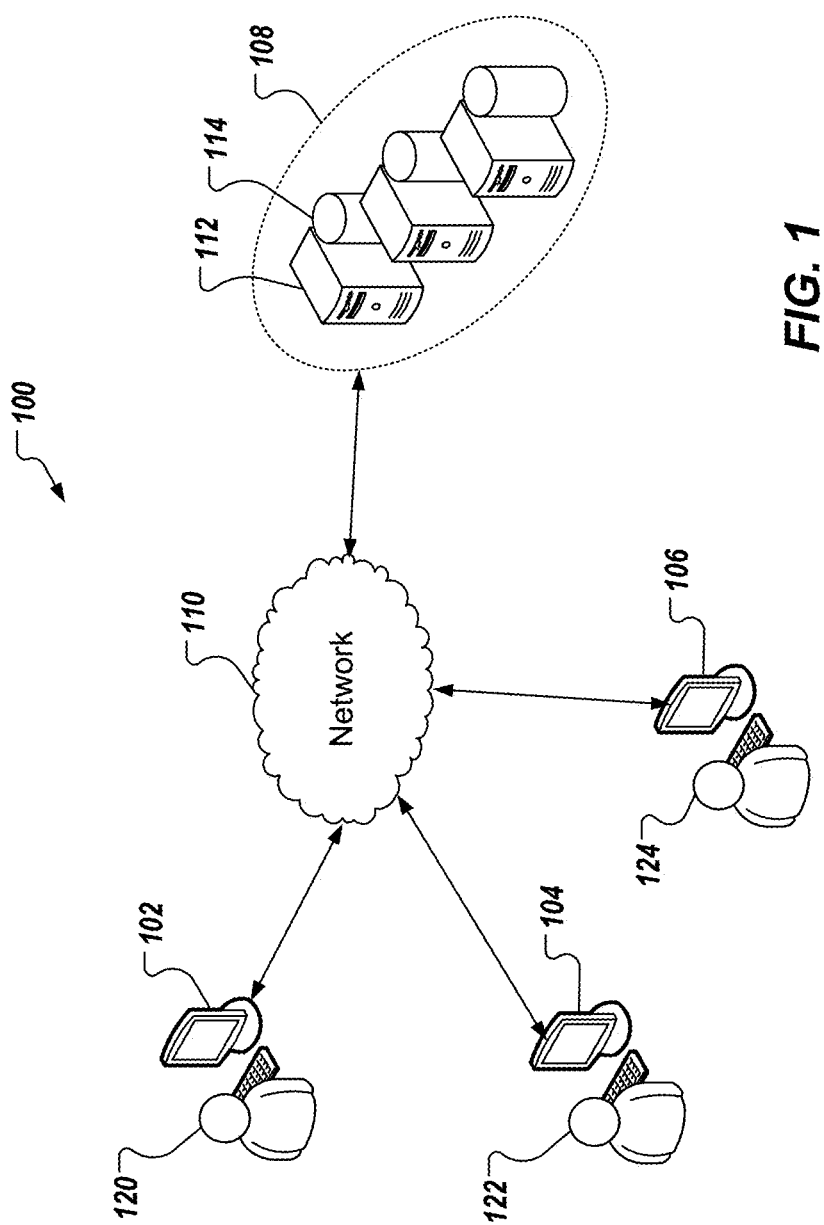
FIG. 1 depicts an example system that can execute implementations of the present disclosure.

FIG. 1 depicts an example system 100 that can execute implementations of the present disclosure. The example system 100 includes computing devices 102, 104, 106, a back-end system 108, and a network 110. In some examples, the network 110 includes a local area network (LAN), wide area network (WAN), the Internet, or a combination thereof, and connects web sites, devices (e.g., the computing device 102, 104, 106), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a computer-implemented service for generating explanatory electronic documents in accordance with implementations of the present disclosure.

In some examples, the computing devices 102, 104, 106 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the computing devices 102, 104, 106 are each provided as a desktop computer that is used by respective users 120, 122, 124. In the example context, the users 120, 122, 124 are employees of an enterprise. For example, the user 120 can include an employee "Jamie," who is submitting expenses for travel for work, the user 122 can include an employee "Paul," who had previously submitted expenses for travel for work, and the user 124 can include an employee "Tom," who had also previously submitted expenses for travel for work. In some examples, each user 120, 122, 124 is associated with a user profile maintained by the enterprise. In some examples, the user profile includes one or more attributes (e.g., name, group, role, contact information, etc.). In some implementations, the enterprise maintains a knowledge base of information associated with each user. For example, the enterprise maintains a knowledge base of information associated with travel (e.g., duration, location, type, hotels, travel conveyances, respective expenses) each of the users has undertaken as part of their employment.

In accordance with implementations of the present disclosure, and as introduced above, explanatory electronic documents are automatically generated based on a knowledge graph, semantic context association, semantic association of users, filtering, and reasoning. In some implementations, the knowledge graph is provided based on data associated with one or more subjects. In some examples, the data is provided as historical data that reflects one or more subjects that are associated with the enterprise. In the example context, the knowledge graph is provided based on data associated with expenses for travel that has been performed by users (e.g., users 120, 122, 124) of the enterprise.

In some examples, a knowledge graph is a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a person Alpha, a node B represents a person Beta, and an edge E is associated with the relationship "is the father of," then having the edge E connect the nodes in the direction from node A to node B in the graph represents the fact that Alpha is the father of Beta. In some examples, the knowledge graph can be enlarged with schema-related knowledge (e.g., Alpha is a concept Person, Beta is a concept Person, and "is the father of" is a property or relationship between two entities/instances of concept Person). Adding schema-related information supports evaluation of reasoning results.

A knowledge graph can be represented by any of a variety of physical data structures. For example, a knowledge graph can be represented by triples that each represent two entities in order, and a relationship from the first to the second entity; for example, [alpha, beta, is the father of], or [alpha, is the father of, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers.

The entities represented by a knowledge graph need not be tangible things or specific people. The entities can include particular people, places, things, artistic works, concepts, events, or other types of entities. Thus, a knowledge graph can include data defining relationships between people (e.g., co-stars in a movie); data defining relationships between people and things (e.g., a particular singer recorded a particular song); data defining relationships between places and things (e.g., a particular type of wine comes from a particular geographic location); data defining relationships between people and places (e.g., a particular person was born in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a person could have a schema defining fields for information such as birth date, birth place, and so on. Such information can be represented by fields in a type-specific data structure, or by triples that look like node-relationship-node triples (e.g., [person identifier, was born on, date]), or in any other convenient predefined way. In some examples, some or all of the information specified by a type schema can be represented by links to nodes in the knowledge graph; for example, [one person identifier, child of, another person identifier], where the other person identifier is a node in the graph.

In accordance with the example context, and as described in further detail herein, a knowledge graph can be provided as a collection of data and a schema representing subjects and relationships between subjects, and/or features of subjects. For example, a knowledge graph, or at least a portion thereof, can be provided as a collection of data representing a trip and features of a trip, and respective expenses.

Figure 2:
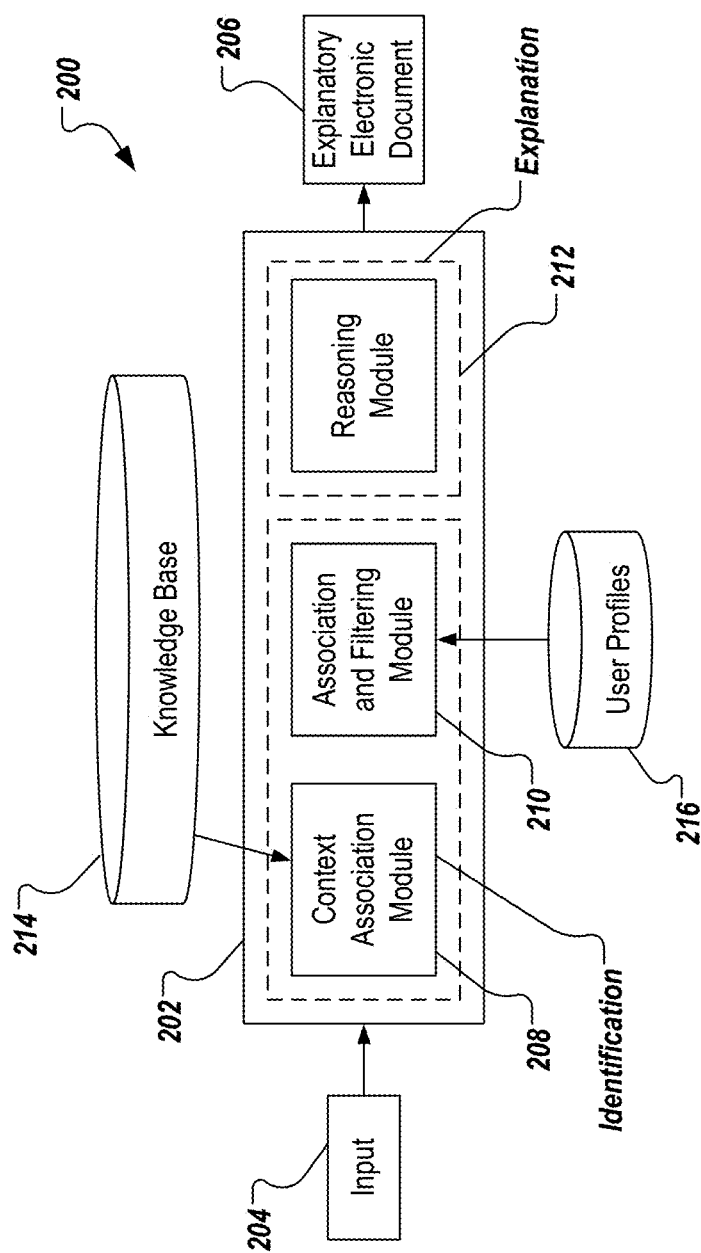
FIG. 2 depicts an example module architecture in accordance with implementations of the present disclosure.

FIG. 2 depicts an example module architecture 200 in accordance with implementations of the present disclosure. The example module architecture 200 includes an explanatory electronic document generation module 202 that receives input data 204, and provides an explanatory electronic document 206. In the depicted example, the explanatory electronic document generation module 202 includes a context association module 208, an association and filtering module 210, and a reasoning module 212. The example module architecture 200 also includes a knowledge base 214, and a user profile database 216. In some examples, each of the modules is provided as one or more computer-executable programs executed by one or more computing devices (e.g., of the back-end system 108 of FIG. 1).

In some implementations, the knowledge base 214 stores historical data associated with one or more subjects. In the examples context, the knowledge base 214 stores data indicative of user profiles (e.g., unique user identifiers associated with respective user profiles), trips, and features of trips, and respective expenses therefor. In some examples, the data is stored as a knowledge graph, described in further detail herein. In some examples, data in the knowledge base 214 is organized based on an ontology for semantic querying, ordering, and ranking, described in further detail herein. In some examples, the user profile database 216 stores user profiles of respective users of the enterprise. For example, each user profile is associated with a unique identifier that identifies a respective user (e.g., an employee ID assigned to, and unique to the user). In some examples, each user profile stored in the user profile database 216 includes one or more attributes (e.g., name, group, role, contact information, etc.) of the respective user.

In some examples, the input 204 includes data defining a subject and one or more features of a subject. In the example context, the input 204 includes data defining expenses for a trip taken by a user, and features of the trip. In some implementations, the input 204 can be described as a request (Q) that has a plurality of entities ($E_1, \ldots, E_m$) associated therewith. For example, the user Jamie (e.g., the user 120 of FIG. 1) is requesting reimbursement for expenses for a trip and provides the following example request as input defining the trip:

Request Q:
$E_1$: Business Dinner —$1200 (expense)
$E_2$: 2 days (duration)
$E_3$: Austin, Tex., USA (location)
$E_4$: Acme, Inc. (client)
$E_5$: Acquisition (justification)

In some examples, the input is associated with the unique identifier that identifies the user providing the input (e.g., an employee ID assigned to, and unique to Jamie).

In accordance with implementations of the present disclosure, context elaboration is performed based on the request (e.g., the input 204). In some examples, the context elaboration is performed using a knowledge graph to elaborate on the context associated with the request. In some examples, additional features of the subject can be determined from the knowledge graph.

Figure 3:
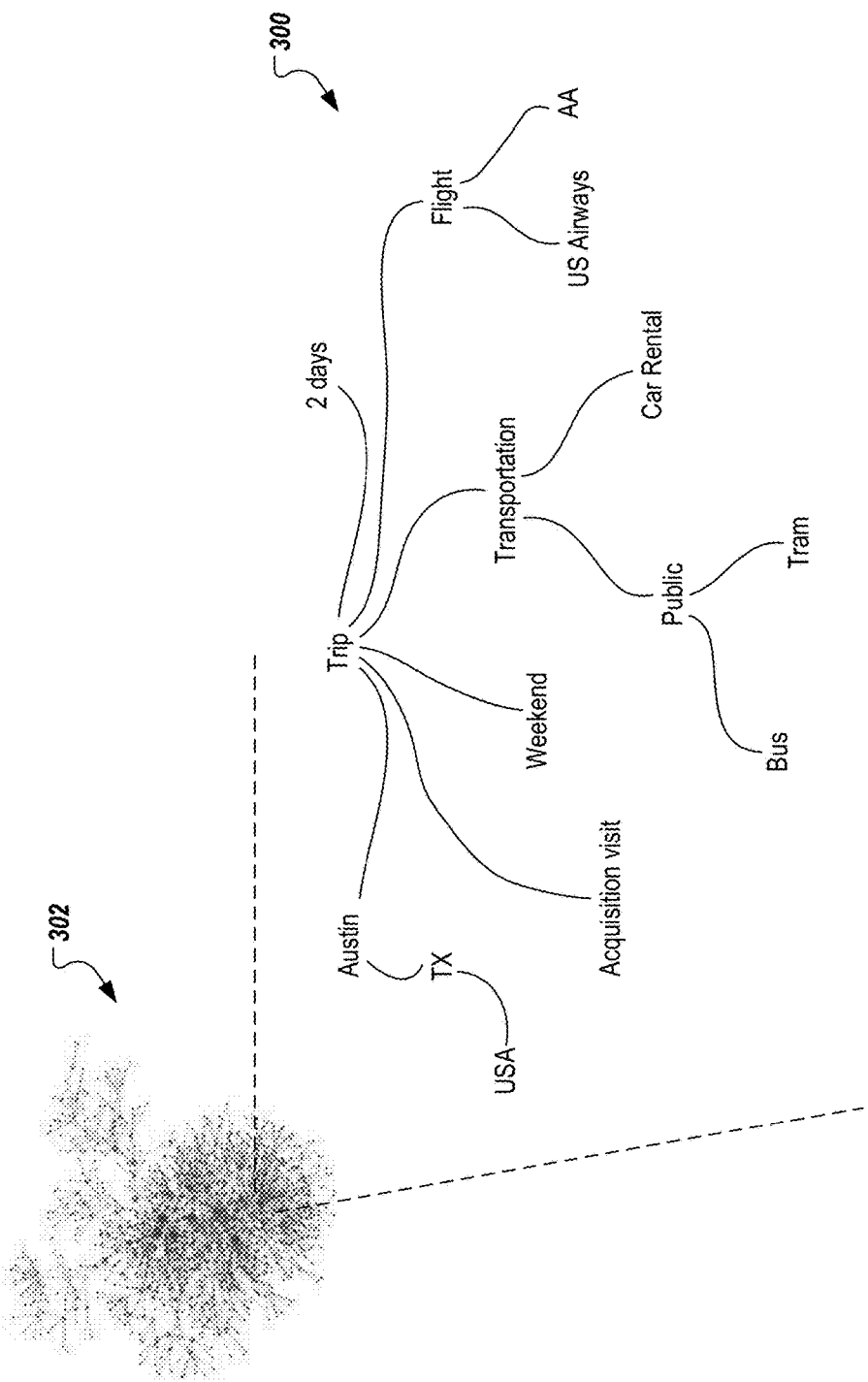
FIG. 3 depicts an example portion of an example knowledge graph.

FIG. 3 depicts an example portion 300 of an example knowledge graph 302 in accordance with the example context. In the depicted example, a node Trip is related to a plurality of other nodes (e.g., Austin, Acquisition Visit, Weekend, Transportation, Flight, 2 days), by respective edges. In some examples, each edge represents a relationship between nodes. For example, the edge between Trip and Austin represents a relationship of [travel to], and the edge between Trip and Acquisition Visit represents a relationship of [justification for]. Using the example knowledge graph 302, additional context can be provided for the request, such as, for example, Weekend, Marriott, Hyatt, American Airlines, US Airways, AA, and the like.

In some implementations, semantic context association is conducted based on the request and one or more hierarchical ontologies to provide an expenditure profile.

Figure 4:
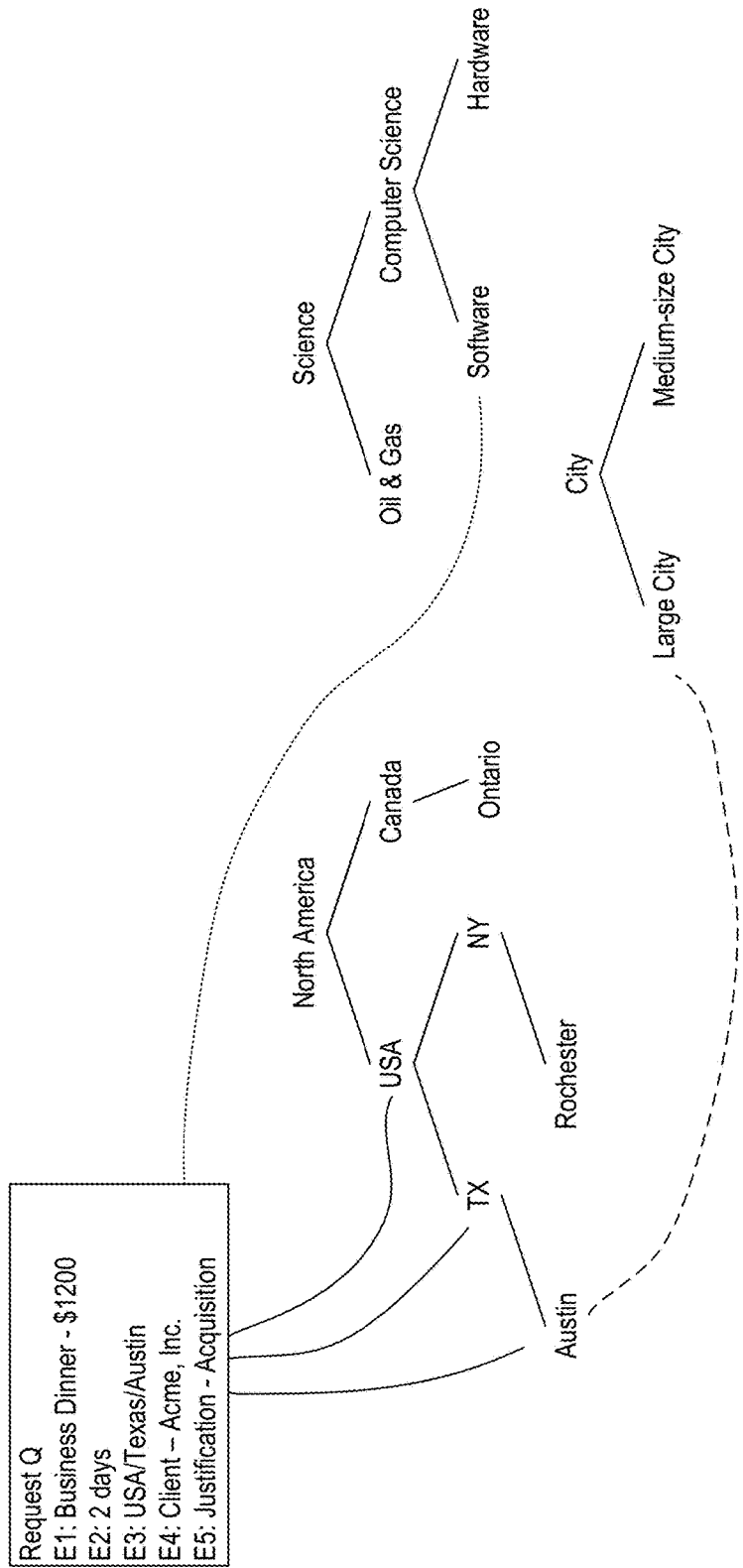
FIG. 4 depicts a graphical representation of example semantic identification of subjects in accordance with implementations of the present disclosure.

FIG. 4 depicts a graphical representation of example semantic context association in accordance with implementations of the present disclosure. In the depicted example, a hierarchical ontology is provided in view of the example context. For example, a hierarchical (or taxonomy-based) ontology for North America is provided, where USA and Canada are both countries in North America, TX and NY are both states in USA, etc. As another example, a hierarchical ontology for Science is provided, where Computer Science and Oil & Gas are types of sciences, and Software and Hardware are sub-categories of Computer Science. As another example, a hierarchical ontology for City is provided, where Large City and Medium-size City are both types of cities.

In some implementations, semantic context association is provided by retrieving all concepts in the knowledge graph (KG) that are more general, based on ontology, than the types of entities E in the request Q. In other words, semantic context association is based on the semantic connections of type in the knowledge graph. In some implementations, semantic context association can be represented by the following example relationship:

Context Association$(Q=E_1, \ldots, E_m, g=KG) = \{E_1^x, \ldots, E_m^x | E_i \in Q, E_i^x \in g\}$ where $E_i^x$ is more general than $E_i$. Continuing with the example above, $E_3$ includes Austin, Tex., USA. Consequently, more general types, based on the ontology of FIG. 4, can include USA, North America, Large City, and City. As another example, $E_4$ includes Acme, Inc., which can be determined to be a Software Company (e.g., from the knowledge graph), and more general types can be provided as Computer Science and Science.

In some implementations, context association is performed to provide an expenditure profile. In some examples, the expenditure profile includes one or more summaries of the trip, for which reimbursement is being requested. In some examples, the summaries have varying degrees of generality based on the types provided from the context association described above. In view of the examples above, an example expenditure profile based on the request Q can include:

Expenditure Profile:
Acquisition of Software Company in Large City in USA
. . .
Acquisition of Computer Science Company in City in North America In this example, Software Company, Large City, USA are more general than entities provided in the request Q (e.g., Acme, Inc., Austin, Tex.), and Computer Science Company, City, and North America are still more general. In some examples, the fact that Acme, Inc. is a Software Company is provided from the knowledge graph, and the generalized terms (e.g., Software, Computer Science; USA, North America) are provided from the ontologies (see FIG. 4). In some implementations, the expenditure profile is associated with the user, who submitted the input, and is stored in computer-readable memory. In this manner, the expenditure profile can be subsequently retrieved for the user.

In some implementations, a set of user profiles is provided based on the semantic user profile association. In some examples, each stored subject is associated with a respective user profile (e.g., the user profile of the user that took the trip, sought reimbursement). In some examples, the set of user profiles includes unique user profiles. For example, if a user is associated with multiple subjects included in the semantic user profile association, the user profile of the user is only included once in the set of user profiles (e.g., Tom took 10 trips of the 50 stored trips semantic user profile association was provided for, but Tom's profile is only included once in the set of user profiles).

Figure 5:
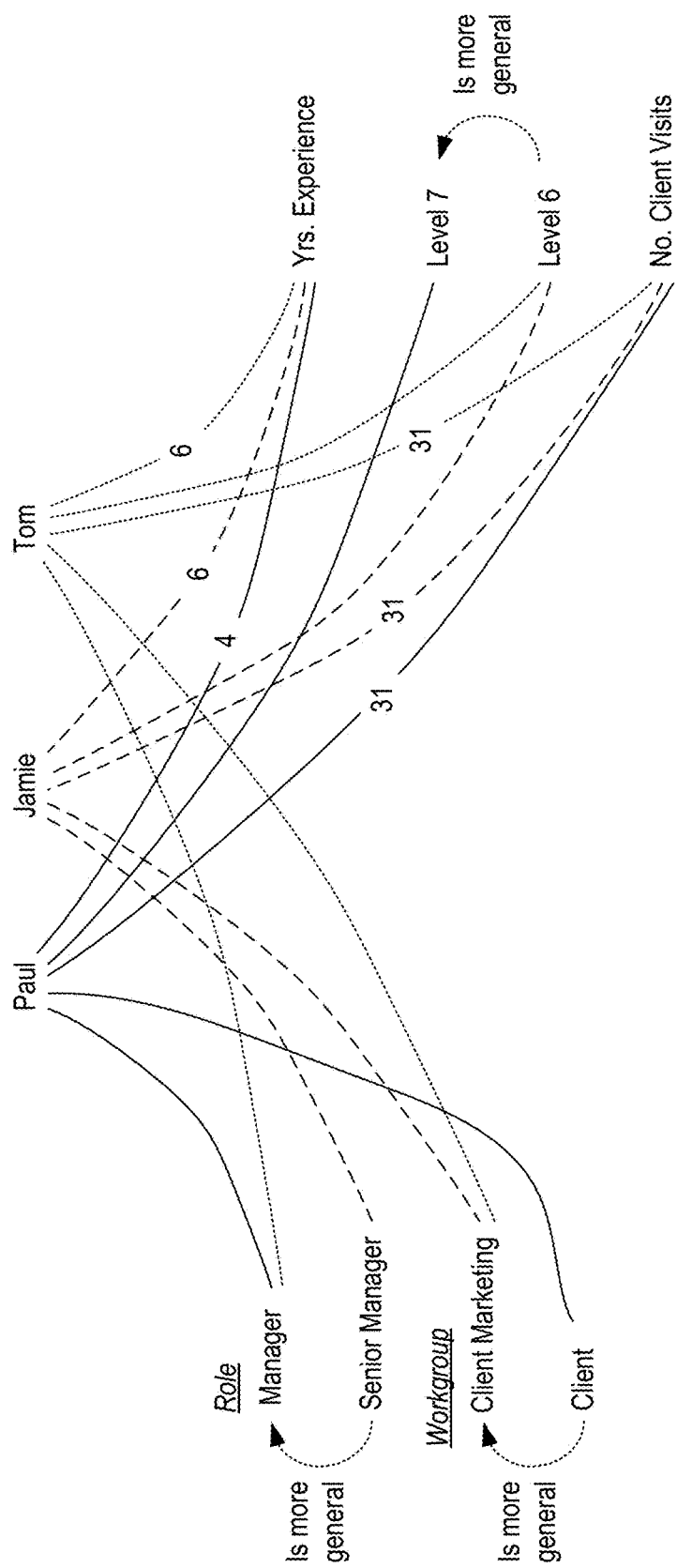
FIG. 5 depicts a graphical representation of example semantic correlation of users in accordance with implementations of the present disclosure.

FIG. 5 depicts a graphical representation of example semantic user profile association in accordance with implementations of the present disclosure. In some implementations, the semantic user profile association is provided based on user profiles (e.g., stored in the user profile database 216). For example, the user profile of the user that submitted the input 204 (e.g., Jamie) can be retrieved from the user profile database 216 based on the unique identifier (e.g., employee ID), and can be compared to one or more other user profiles stored in the user profile database 216 (among, potentially, tens, hundreds, thousands of other user profiles). More particularly, the user profile can be compared to user profiles in the set of user profiles.

In some implementations, the semantic user profile association is provided based on comparing user profiles. In some examples, semantic user profile association of a first user profile and a second user profile is evaluated by measuring the number of overlapped descriptions, where generalization is captured in the association, but is penalized. Semantic user profile association can be represented by the following example relationship:

$$SUPA(U_x, U_y, KG, \mathcal{L}) = \frac{\Sigma_{C|\exists C_1, C_2, (U_x, C_1, C), (U_y, C_2, C)} \mathcal{L}(C_1, C_2)}{\Sigma | C | \exists C_1, C_2, (U_x, C_1, C), (U_y, C_2, C)|}$$

where:
KG is the knowledge graph;
$(U_x, C_1, C)$ and $(U_y, C_2, C)$ are paths in the knowledge graph; and $$\mathcal{L}(C_1, C_2) = \begin{cases} 1 & \text{if } C_1 \text{ and } C_2 \text{ are equivalentent} \\ 0.75 & \text{if } C_1 \text{ is less general than } C_2 \\ 0.25 & \text{if } C_1 \text{ is more general than } C_2 \\ 0 & \text{otherwise} \end{cases}$$

In some implementations, semantic user profile association results in a numeric value (SUPA) that quantifies a semantic association between two user profiles, $U_x$ and $U_y$. Continuing with the example above, and with reference to FIG. 5, user profiles for Jamie, Paul, and Tom are graphically depicted and include example features (C) Role (e.g., Manager, Senior Manager), Workgroup (e.g., Client Marketing, Client), Years of Experience, Level (e.g., Level 6, Level 7), and Number of Client Visits. For example, and as depicted in FIG. 5, the following semantic user profile association results can be provided:

(Jamie, {(Paul, 0.55), (Tom, 0.85)} which indicates that Jamie's user profile is closer to Tom's user profile than it is to Paul's user profile. For example, the higher the value, the closer the user profile is to the user profile it is being compared with. In view of the example of FIG. 5, Jamie's user profile is closer to Tom's user profile based on the semantic association of Years of Experience, Level, Workgroup (Client Marketing), and Number of Client Visits.

In accordance with implementations of the present disclosure, a peer expenditure profile is retrieved (e.g., from computer-readable memory) for the user, who's profile is most closely semantically associated with the user, who provided the input. For example, and as discussed above, Jamie provided the input, and Tom's user profile is most-closely semantically associated with Jamie's user profile (e.g., more so than Paul's). Consequently, a peer expenditure profile associated with Tom is retrieved. In some examples, the peer expenditure profile includes summaries of trips, for which the respective user has requested expense reimbursement, the summaries being at varying degrees of generality (e.g., as similarly described above with respect to the expenditure profile).

Continuing with the example above, an example peer expenditure profile for Tom can be provided as:

Expenditure Profile→Tom:
Acquisition of an Oil & Gas company in a small city in China
. . .
Acquisition of an Oil & Gas company in Fuxin city in Liaoning
Acquisition of a Company in a large city in US In some implementations, multiple peer expenditure profiles can be retrieved. For example, and continuing with the examples above, Tom's expenditure profile was selected, because Tom's user profile is closest to Jamie's user profile. In some examples, it can be determined that Tom's user profile, and another peer's user profile, are equally close to Jaimie's user profile. Consequently, both peer expenditure profiles are retrieved and further processed as described herein. In some implementations, a threshold score can be provided, and any peer user profiles that exceed the threshold score are included in a set of user profiles, for which peer expenditure profiles can be retrieved, and processed as described herein.

In some implementations, the expenditure profile for the requested reimbursement, and the peer expenditure profile(s) are compared to filter out particular associations (summaries). For example, particular associations can be discarded, and other associations remain. In some examples, filtering associations is performed by comparing each association (summary) of the target expenditure profile (e.g., the expenditure profile for the reimbursement currently being requested) to one or more summaries of the peer expenditure profile(s), and removing any associations in the peer expenditure profile(s) that are more specific than the targeted expenditure profile. In this manner, the remaining associations (summaries) include only those that are semantically similar.

Associations that are to be discarded can be represented by the following example relationship:

Discarded Association$(EP_1, EP_2, KG) = \{(X_1, X_2)$
$\mathsf{C}_{EP_1 \times EP_2} | \forall E_1 \in X_1, \exists E_2 \in X_2, E_1$ is more specific than $E_1\}$ where:
EP is an expenditure profile of a respective user;
X is an attribute of the expenditure profile; and
E is a value of a respective attribute.

For example, an attribute X can include City Location, or Business Goal, and a value E can include Large City, or Acquisition, respectively.

Associations that are to remain can be represented by the following example relationship:

Remaining Association$(EP_1, EP_2, KG) = \{(X_1, X_2)$
$\mathsf{C}_{EP_1 \times EP_2} | \forall E_1 \in X_1, \exists E_2 \in X_2, E_1$ is more specific than $E_2\}$ Continuing with the examples above, it can be determined that the association "Acquisition of Software Company in Large City in USA" of the target expenditure profile, and the associations "Acquisition of an Oil & Gas company in a small city in China," and "Acquisition of an Oil & Gas company in Fuxin city in Liaoning" of the historical expenditure profile are to be discarded. It can also be determined that the association "Acquisition of Computer Science Company in City in North America" of the target expenditure profile, and "Acquisition of a Company in Large City in US" of the historical expenditure profile are to remain.

In some implementations, the remaining associations are processed based on expenditure profile reasoning to provide one or more explanations regarding expenses. In some examples, explanation of unnecessary expenses are evaluated by comparing each item of the expenditure profile with the similar types of items (e.g., taxi, hotel, dinner, etc.) of the peer expenditure profile(s). In some examples, explanations correspond to items that have similar types (e.g., taxi), but have incompatible semantic values as determined form the knowledge graph (e.g., low vs. high). In some examples, an unnecessary expense can be determined based on the following example relationship:

Unnecessary Expense$(EP, \{EP_1, \ldots, EP_m\}, KG) =$ $$\left\{ \begin{array}{c} X | X \in e(EP) \text{ AND } \exists i | X \text{ and } EP_i \text{ are defined by the following} \\ a) \Delta(X, EP_i) \text{ are incompatible with } KG \\ b) \exists X tKG, \exists EP_i \text{ such that } X \text{ and } EP \text{ are similar} \end{array} \right\}$$

where:
KG is the knowledge graph;
EP is the target expenditure profile i.e. the expenditure we want to get explanation from;
$\{EP_1, \ldots, EP_m\}$ is the set of peer expenditure profiles being compared;
e(EP) is the set of expenditures of EP;
$\Delta(X, EP_i)$ evaluates the semantic similarity of X and $EP_i$; and
incompatibility in the knowledge graph is detected through explicit edges of the knowledge graph.

In general, expenses of the target expenditure profile are compared to semantically similar expenses of the peer expenditure profile. If values of the semantically similar expenses are determined to be dissimilar (e.g., based on types determined from the knowledge graph), such expenses are flagged as dissimilar. If values of the semantically similar expenses are determined to have same type (e.g., based on types determined from the knowledge graph), such expenses are flagged as similar.

Continuing with the examples above, expenses of the remaining association in the peer expenditure profile for Tom can be compared to the expenses being submitted for reimbursement by Jamie. Expanding on the examples above, expenses of the remaining association in peer expenditures for other similar users (e.g., based on user profile comparisons described above) can also be compared to the expenses being submitted for reimbursement by Jamie. For example, the expenses being submitted by Jamie can include $456 for taxis, and 3 restaurant meals with an average expense of $400 each. It can be determined that the remaining association from Tom's expenditure profile includes an $89 expense for taxis (e.g., semantically similar based on type taxi), but that the values are dissimilar (e.g., $456 is of type "High" and $89 is of type "Low" from the knowledge graph). It can be determined that one or more remaining associations from one or more peer expenditures (e.g., other than Tom's) includes 3 restaurant meals with an average expense of $330 each, and that these values are similar (e.g., of are the same type in the knowledge graph).

In some implementations, textual explanations are automatically provided for each expense being submitted for reimbursement. If values of the semantically dissimilar expenses are determined to conflicting types (e.g., based on types determined from the knowledge graph), such expenses are flagged as dissimilar, and thus as unnecessary. In some examples, explanations of unnecessary spending are evaluated by comparing each item of the expenditure profile with the similar types of items (e.g., taxi, hotel, dinner) from relevant set of expenditure profiles. The textual description of the explanations are the descriptions, which have similar types, but with incompatible semantic value with respect to the knowledge graph (e.g., low vs. high with respect to the knowledge graph). The data value of the targeted expenses type (e.g., $456 Taxi expenses) is reported together with a statistic of how many other expenses do not have this data value (e.g., 89% of peer group chose public transportation for similar trip to Boston).

In general, implementations of the present disclosure analyze associations at various levels of generality/specificity, as described herein, which the explanatory text strings are based on. In this manner, an explanation of an event (e.g., dissimilar expenses) is provided, rather than simply identifying similarities between the user and peers of the user.

In some implementations, the explanatory electronic document is populated based on the expenses and explanations. In some examples, a template explanatory document can be provided and can include fields that are initially absent values. In some examples, a field can be assigned to a respective type of expense (e.g., flight, hotel, taxi, meals), and can be associated with an explanation field. In some examples, for each type of expense in the target expenditure profile, the field can be populated by the value submitted for the expense (e.g., $456 for taxis), and the explanation field can be populated by the explanation determined for the expense (e.g., unnecessarily HIGH, because 89% of peers used less expensive, public transportation).

In some implementations, the explanatory electronic document is populated as described above, and is displayed to the user. For example, the explanatory electronic document can be displayed to the user on a computing device. In some examples, the user can edit one or more features of the subject captured in the electronic document. For example, the user can add, delete, or edit (modify) one or more features.

FIG. 6 depicts an example explanatory electronic document 600 in accordance with implementations of the present disclosure. In accordance with the example context, the example explanatory electronic document 600 includes a reimbursement request with expense details for flights, car rental, hotel, and the like, as well as an explanation of unnecessary expenses, where relevant.

Figure 7:
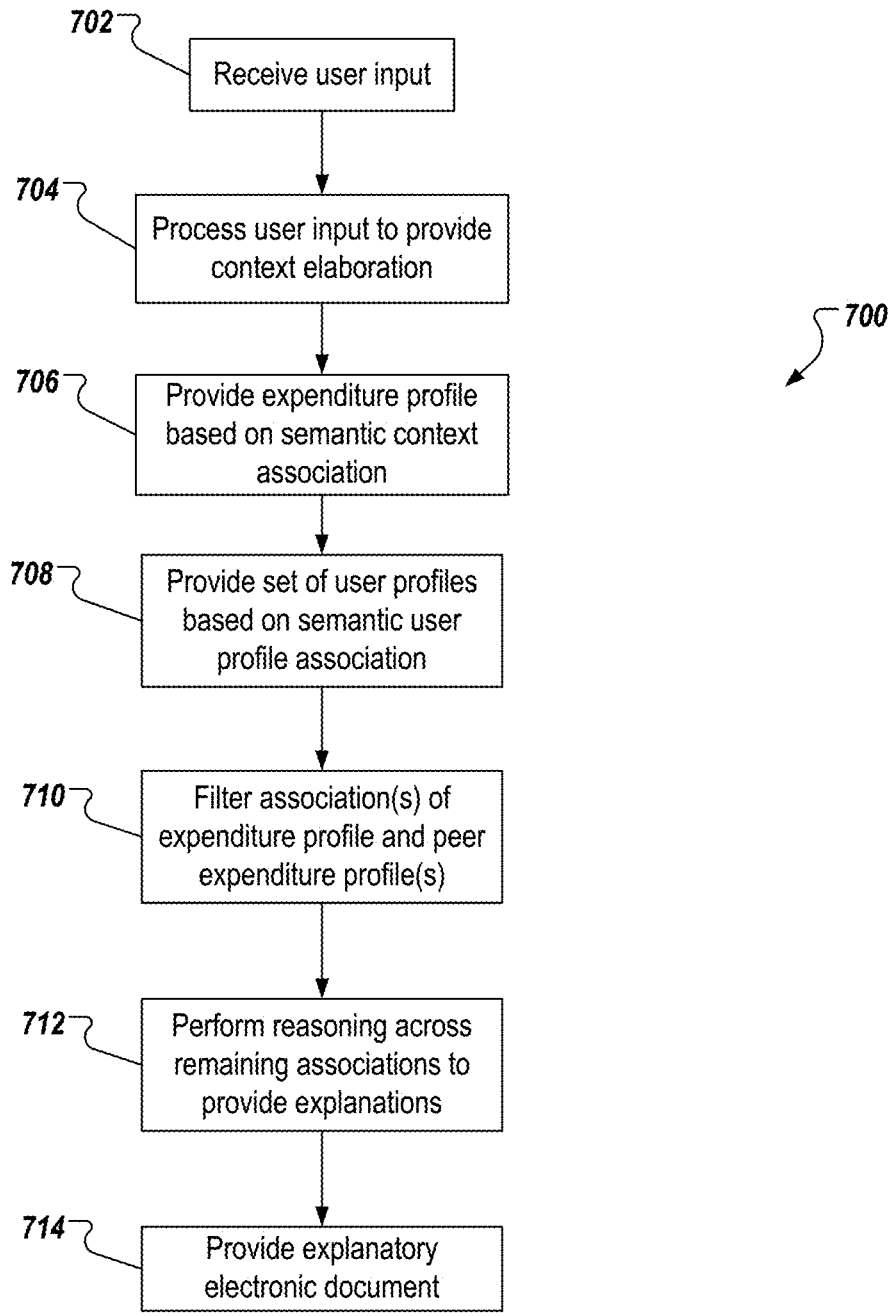
FIG. 7 depicts an example processes that can be executed in implementations of the present disclosure.

FIG. 7 depicts an example process 700 that can be executed in implementations of the present disclosure. In some examples, the example process 700 is provided using one or more computer-executable programs executed by one or more computing devices (e.g., the back-end system 108 of FIG. 1). The example process 700 can be executed to provide an explanatory electronic document, as described herein.

User input is received (702). For example, a user provides input 204 to the explanatory electronic document generation module 202 of FIG. 2. In some examples, the user input provides data indicative of a subject. In the example context, the user input provides data indicative of expenses for reimbursement, and a trip, during which the expenses were incurred. In some examples, the user input also include an identifier associated with the user submitting the reimbursement request. The user input is processed to provide context elaboration (704). For example, and as described herein, context elaboration is performed using a knowledge graph to elaborate on the context associated with the user input.

An expenditure profile is provided based on semantic context association (706). For example, and as described in detail herein, semantic context association is conducted based on the request and one or more hierarchical ontologies to provide the expenditure profile. In some examples, the expenditure profile includes one or more summaries that describe the subject to varying degrees of specificity/generality. A set of user profiles is provided based on the semantic user profile association (708). For example, and as described herein, the user profile of the user that submitted the request is compared to user profiles of one or more peers (e.g., other employees of the enterprise), and a score (e.g., SUPA) is determined for each comparison. In some examples, the set of user profiles includes the peer user profile having the highest score. In some examples, the set of user profile includes one or more peer user profiles having respective scores that exceed a threshold score.

One or more associations of the expenditure profile and one or more peer expenditure profiles are filtered (710). For example, and as described in detail herein, one or more peer expenditure profiles can be retrieved (e.g., from computer-readable memory), each peer expenditure profile corresponding to a user profile in the set of user profiles. Associations (summaries) between the target expenditure profile, and each of the peer expenditure profiles are compared, and an association is discarded (filtered) from the peer expenditure profile, if more specific than the respective association in the peer expenditure profile. Reasoning is performed across remaining associations to provide explanation text for expenses (712). For example, and as described in detail herein, explanation of unnecessary expenses are evaluated by comparing each item of the expenditure profile with the similar types of items (e.g., taxi, hotel, dinner, etc.) of the peer expenditure profile(s), where explanations correspond to items that have similar types (e.g., taxi), but have incompatible semantic values as determined form the knowledge graph (e.g., low vs. high). An explanatory electronic document is provided (714). For example, and as described in detail herein, the explanatory electronic document is populated with expenses, and explanations of expenses.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing an explanatory electronic document, the method being executed by one or more processors and comprising:
   receiving, by the one or more processors, input from a user, the input comprising data that is at least partially representative of a subject;
   performing, by the one or more processors, semantic context association based on the user input, one or more computer-readable ontologies, and a computer-readable knowledge graph to provide a target subject profile, the target subject profile comprising two or more associations describing the subject at respective degrees of specificity, at least one association comprising concepts from the knowledge graph that are more general than respective entities provided in the input;

providing, by the one or more processors, a set of peer user profiles based on a user profile and a superset of peer user profiles using semantic user profile association between the user profile and each peer user profile in the superset of peer user profiles;

retrieving, by the one or more processors, one or more peer subject profiles from computer-readable memory, each peer subject profile being associated with a peer user profile in the set of peer user profiles, and comprising one or more associations, each association describing a past subject experienced by a peer user;

filtering, by the one or more processors, at least one association from a peer subject profile based on a comparison with a respective association in the target subject profile and data provided in the knowledge graph;

providing, by the one or more processors, at least one explanatory text string associated with the subject based on at least one remaining association in the peer subject profile; and providing, by the one or more processors, the explanatory electronic document comprising the at least one explanatory text string.

2. The method of claim 1, wherein semantic user profile association comprises:

determining respective scores for each peer user profile in the superset of peer user profiles based on the user profile and the knowledge graph; and including a peer user profile in the set of peer user profiles based on the respective score.

3. The method of claim 1, wherein filtering at least one association from a peer subject profile comprises determining that the at least one association is more specific than a respective association of the target subject profile, and in response, removing the at least one association.

4. The method of claim 1, wherein providing the at least one explanatory text string comprises determining that a subject associated with the at least one remaining association is of the same type and of a different value than a respective subject of a peer subject profile, and in response, retrieving the at least one explanatory text string from computer-readable memory.

5. The method of claim 1, wherein the explanatory electronic document provides explanations related to one or more expenses incurred, the at least one explanatory text string being associated with a respective expense.

6. The method of claim 1, wherein the subject comprises a trip and the input comprises trip details and one or more expenses incurred.

7. The method of claim 1, wherein the target subject profile comprises a target expenditure profile, and the two or more associations describe a trip at respective degrees of specificity.

8. The method of claim 1, wherein each peer subject profile comprises a peer expenditure profile, and the past subject comprises a trip undertaken by the peer user.

9. The method of claim 1, further comprising receiving, from computer-readable memory, the user profile, the user profile comprising one or more of a role of the user, previous actions conducted by the user, and a level of experience of the user.

10. The method of claim 1, further comprising receiving data informative of an enterprise associated with the user, the at least one explanatory text string being partially based on the data.

11. A non-transitory computer-readable storage medium coupled to one or more processors and having instructions stored thereon which, when executed by the one or more processors, cause the one or more processors to perform operations for providing an explanatory electronic document, the operations comprising:

receiving, by the one or more processors, input from a user, the input comprising data that is at least partially representative of a subject;

performing, by the one or more processors, semantic context association based on the user input, one or more computer-readable ontologies, and a computer-readable knowledge graph to provide a target subject profile, the target subject profile comprising two or more associations describing the subject at respective degrees of specificity, at least one association comprising concepts from the knowledge graph that are more general than respective entities provided in the input;

providing, by the one or more processors, a set of peer user profiles based on a user profile and a superset of peer user profiles using semantic user profile association between the user profile and each peer user profile in the superset of peer user profiles;

retrieving, by the one or more processors, one or more peer subject profiles from computer-readable memory, each peer subject profile being associated with a peer user profile in the set of peer user profiles, and comprising one or more associations, each association describing a past subject experienced by a peer user;

filtering, by the one or more processors, at least one association from a peer subject profile based on a comparison with a respective association in the target subject profile and data provided in a knowledge graph;

providing, by the one or more processors, at least one explanatory text string associated with the subject based on at least one remaining association in the peer subject profile; and providing, by the one or more processors, the explanatory electronic document comprising the at least one explanatory text string.

12. The computer-readable storage medium of claim 11, wherein semantic user profile association comprises:

determining respective scores for each peer user profile in the superset of peer user profiles based on the user profile and the knowledge graph; and including a peer user profile in the set of peer user profiles based on the respective score.

13. The computer-readable storage medium of claim 11, wherein filtering at least one association from a peer subject profile comprises determining that the at least one association is more specific than a respective association of the target subject profile, and in response, removing the at least one association.

14. The computer-readable storage medium of claim 11, wherein providing the at least one explanatory text string comprises determining that a subject associated with the at least one remaining association is of the same type and of a different value than a respective subject of a peer subject profile, and in response, retrieving the at least one explanatory text string from computer-readable memory.

15. The computer-readable storage medium of claim 11, wherein the explanatory electronic document provides explanations related to one or more expenses incurred, the at least one explanatory text string being associated with a respective expense.

16. The computer-readable storage medium of claim 11, wherein the subject comprises a trip and the input comprises trip details and one or more expenses incurred.

17. The computer-readable storage medium of claim 11, wherein the target subject profile comprises a target expenditure profile, and the two or more associations describe a trip at respective degrees of specificity.

18. The computer-readable storage medium of claim 11, wherein each peer subject profile comprises a peer expenditure profile, and the past subject comprises a trip undertaken by the peer user.

19. The computer-readable storage medium of claim 11, wherein operations further comprise receiving, from computer-readable memory, the user profile, the user profile comprising one or more of a role of the user, previous actions conducted by the user, and a level of experience of the user.

20. The computer-readable storage medium of claim 11, wherein operations further comprise receiving data informative of an enterprise associated with the user, the at least one explanatory text string being partially based on the data.

21. A system, comprising:
one or more processors; and
a computer-readable storage device coupled to the one or more processors and having instructions stored thereon which, when executed by the one or more processors, cause the one or more processors to perform operations for providing an explanatory electronic document, the operations comprising:
receiving, by the one or more processors, input from a user, the input comprising data that is at least partially representative of a subject;
performing, by the one or more processors, semantic context association based on the user input, one or more computer-readable ontologies, and a computer-readable knowledge graph to provide a target subject profile, the target subject profile comprising two or more associations describing the subject at respective degrees of specificity, at least one association comprising concepts from the knowledge graph that are more general than respective entities provided in the input;
providing, by the one or more processors, a set of peer user profiles based on a user profile and a superset of peer user profiles using semantic user profile association between the user profile and each peer user profile in the superset of peer user profiles;
retrieving, by the one or more processors, one or more peer subject profiles from computer-readable memory, each peer subject profile being associated with a peer user profile in the set of peer user profiles, and comprising one or more associations, each association describing a past subject experienced by a peer user;
filtering, by the one or more processors, at least one association from a peer subject profile based on a comparison with a respective association in the target subject profile and data provided in a knowledge graph;
providing, by the one or more processors, at least one explanatory text string associated with the subject based on at least one remaining association in the peer subject profile; and
providing, by the one or more processors, the explanatory electronic document comprising the at least one explanatory text string.

22. The system of claim 21, wherein semantic user profile association comprises:
determining respective scores for each peer user profile in the superset of peer user profiles based on the user profile and the knowledge graph; and
including a peer user profile in the set of peer user profiles based on the respective score.

23. The system of claim 21, wherein filtering at least one association from a peer subject profile comprises determining that the at least one association is more specific than a respective association of the target subject profile, and in response, removing the at least one association.

24. The system of claim 21, wherein providing the at least one explanatory text string comprises determining that a subject associated with the at least one remaining association is of the same type and of a different value than a respective subject of a peer subject profile, and in response, retrieving the at least one explanatory text string from computer-readable memory.

25. The system of claim 21, wherein the explanatory electronic document provides explanations related to one or more expenses incurred, the at least one explanatory text string being associated with a respective expense.

26. The system of claim 21, wherein the subject comprises a trip and the input comprises trip details and one or more expenses incurred.

27. The system of claim 21, wherein the target subject profile comprises a target expenditure profile, and the two or more associations describe a trip at respective degrees of specificity.

28. The system of claim 21, wherein each peer subject profile comprises a peer expenditure profile, and the past subject comprises a trip undertaken by the peer user.

29. The system of claim 21, wherein operations further comprise receiving, from computer-readable memory, the user profile, the user profile comprising one or more of a role of the user, previous actions conducted by the user, and a level of experience of the user.

30. The system of claim 21, wherein operations further comprise receiving data informative of an enterprise associated with the user, the at least one explanatory text string being partially based on the data.

* * * * *